July 27, 1965  A. E. REX ETAL  3,196,583
MEANS FOR ATTACHING RAILS TO SLEEPERS
Filed July 3, 1961
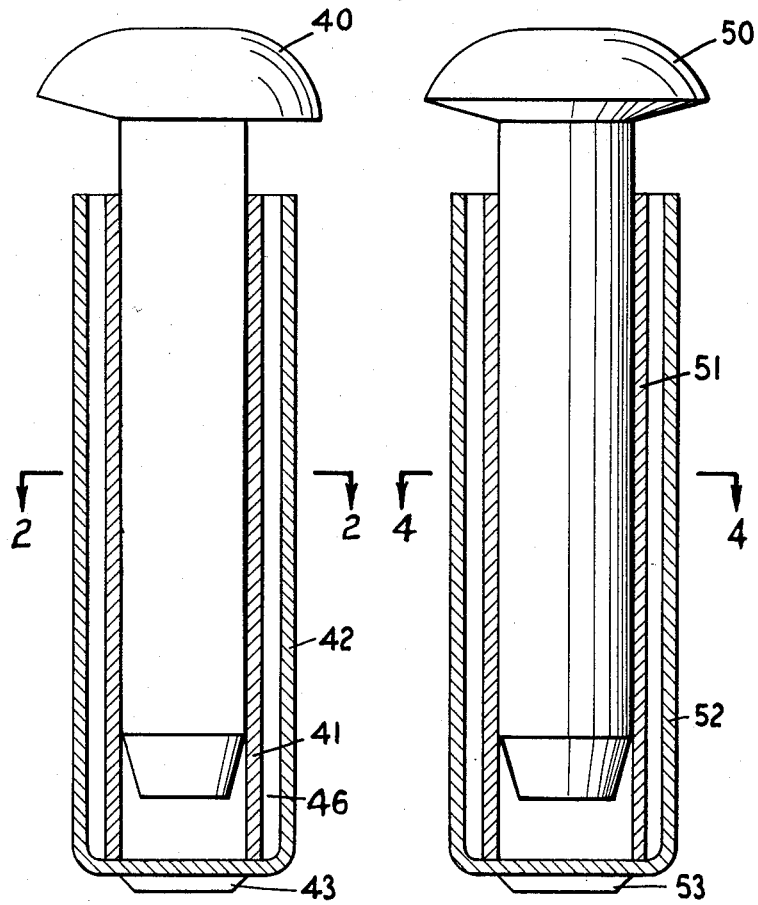
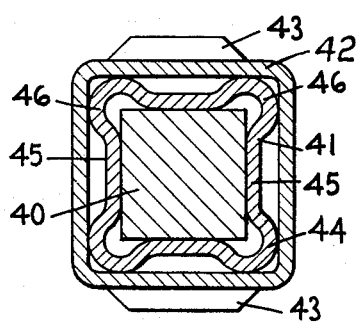
FIG. 2
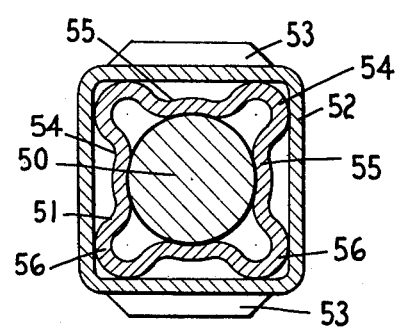
FIG. 4

United States Patent Office 3,196,583
Patented July 27, 1965

3,196,583
MEANS FOR ATTACHING RAILS TO SLEEPERS
Albert Edward Rex, 10 Torrens St., Linden Park, South Australia, Australia, and Edward George Bennett, 117 N. East Road, Collinswood, South Australia, Australia
Filed July 3, 1961, Ser. No. 121,687
Claims priority, application Australia, July 8, 1960, 62,382/60; Dec. 16, 1960, 67,653/60; Jan. 6, 1961, 130/61
1 Claim. (Cl. 50—474)

This invention relates to improved means for locating gauge and attaching rails to such sleepers as concrete or similar sleepers, but the invention can be extended to the attaching of rails to wooden sleepers.

The holding of rails to sleepers introduces considerable problems owing to the intermittent loading which is applied to rails, tending to loosen the holding means and thus allow the rails to be displaced.

The problem is present in all sleepers but is most serious in concrete or other non-resilient sleepers. It has therefore been customary to incorporate bolts or the like in the sleepers and to use clips, spring or otherwise to hold the rails in position thereon, and in some cases it has been proposed to use laminated wood or neoprene or rubber inserts for retaining spikes.

The object of this invention is to provide a means for attaching and locating rails to sleepers, the means including shock absorbing properties whereby tendency to loosen or tendency to damage a sleeper is reduced.

In its simplest form this invention may be used to consist of a socket, a rail retaining spike in said socket and corrugated spring means in said socket, the corrugated spring means applying pressure against the socket walls and also against the spike whereby the spike is retained in the socket.

The corrugated spring means of this invention consists of a tubular member with the walls corrugated in an axial direction, the shape of the member being complementary to the shape of the spike so that contact between the two takes place over a considerable area, as in contrast to the line contact achieved by corrugations of sinusoidal shape.

The invention is described hereunder with reference to the accompanying drawings in which:

FIG. 1 is a longitudinal section of a spike and spike anchor in a socket according to a preferred embodiment characterised in the corrugations in the spike anchor having four inner flat surfaces, FIG. 2 is a section on lines 2—2 of FIG. 1, FIG. 3 illustrates a second embodiment showing a longitudinal section through a spike and spike anchor inserted in a socket, characterised in that the corrugations in the spike anchor save four inwardly formed surfaces defining a part-cylindrical shape, FIG. 4 is a section on line 4—4 of FIG. 3.

The first embodiment as illustrated in FIGS. 1 and 2, wherein a rectangular spike 40 is driven into a s pike anchor 41 disposed within a rectangular socket 42. The rectangular socket 42 has out-turned tabs 43 so that it can be firmly embedded in a concrete sleeper. The spike anchor 41 is corrugated with axial corrugations 44, and has inwardly formed portions 45 defining four inner flat surfaces at right angles to each other which engage the walls of the rectangular spike 40 firmly over a wide area, while the outwardly formed portions 46 of the corrugations 44 engage the inner faces adjacent the corners of the socket 42.

A second embodiment is illustrated in FIGS. 3 and 4, wherein a round spike 50 is inserted in a spike anchor 51 which is itself inserted in a rectangular socket 52, the rectangular socket 52 being formed with out-turned tabs 53. The spike anchor 51 is formed with axial corrugations 54, the inner surface of the inwardly formed portions 55 of which define a part-cylindrical shape which engages the round spike 50 over a considerable area, while the outwardly formed portions 56 of the corrugations 54 engage the inner faces adjacent the corners of the rectangular socket 52.

In all cases it will be seen that the corrugated spring means is effective in applying a pressure against the socket walls and also a pressure against the spike, so that the interference between the assembled members frictionally engages the spike and retains it within the socket.

It will further be appreciated that the use of spring means within the socket is effective to some extent towards the absorption of heavy vibrational forces on a rail retained by the spike, and thereby functions as a shock absorbing medium.

What we claim is:

Apparatus for attaching a rail to a concrete sleeper, said apparatus comprising: a generally tubular socket member adapted for being embedded in said concrete sleeper and including an outwardly projecting protrusion adapted to prevent removal of the socket member from said sleeper, said socket member having a square cross-section and thereby having four corners, said socket member further having a closed end and an open end, a spring member extending axially through said socket and resting on the socket at the closed end thereof, and a rail spike supported in said spring member in spaced relation from the closed end of the socket member, said spike having a smooth outer contour, said spring member including four axially extending corrugations of rounded form respectively engaging the corners of the socket member, said spring member including smooth portions between said corrugations which are complementary to the smooth outer contour of the spike but which cooperatively normally define an opening of smaller radial dimension than said outer contour such that, with the rail spike inserted into said spring member, the corrugations apply pressure both against the corners of the socket member and against the spike while contacting the latter over a substantial portion of the outer contour thereof whereby the spike is frictionally retained in the socket, said smooth portions being spaced from said socket by said corrugations.

References Cited by the Examiner

UNITED STATES PATENTS

| | | | |
|---|---|---|---|
| 862,898 | 8/07 | Forsyth | 238—371 |
| 1,855,329 | 4/32 | Wagner | 238—371 |
| 2,747,904 | 5/56 | Koch | 50—471 X |
| 2,931,412 | 4/60 | Wing | 85—36 |

FOREIGN PATENTS

| | | |
|---|---|---|
| 178,449 | 5/54 | Austria. |
| 1,029,156 | 3/53 | France. |

JACOB L. NACKENOFF, *Primary Examiner.*
HENRY C. SUTHERLAND, *Examiner.*